United States Patent Office 3,372,285
Patented Mar. 5, 1968

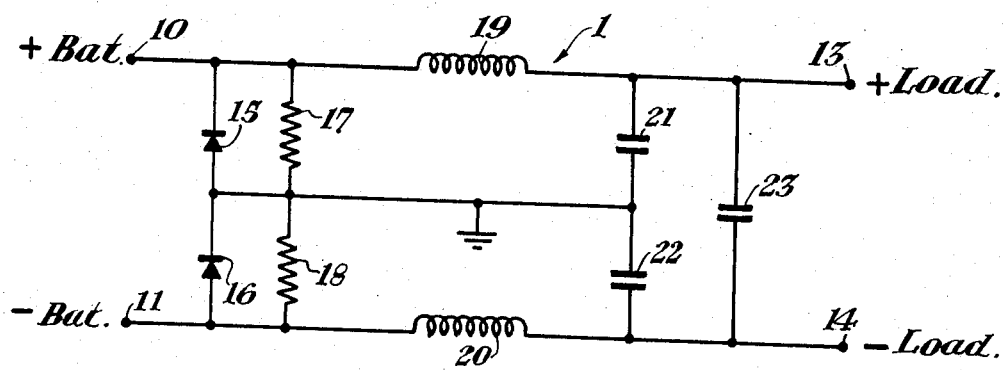
Fig.1.
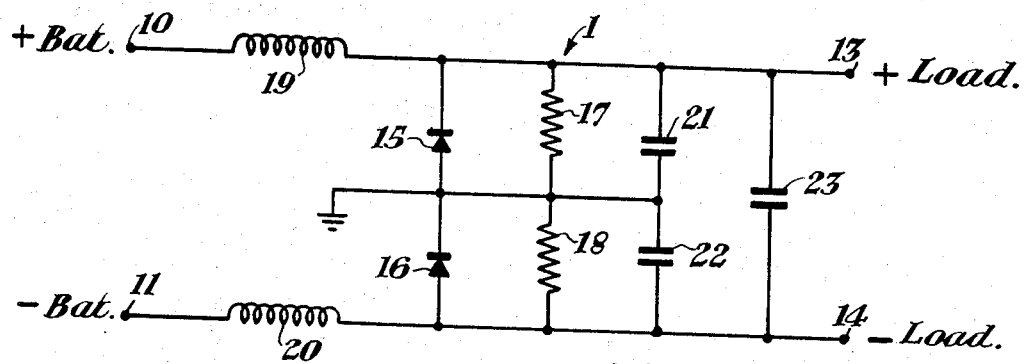
Fig.2.
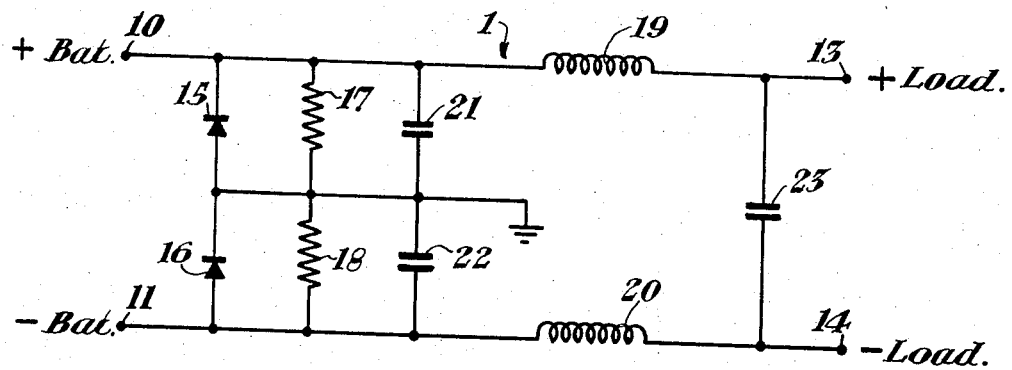
Fig.3.
INVENTORS
Frank V. Blazek and
Chalmers W. Gilbert.
BY
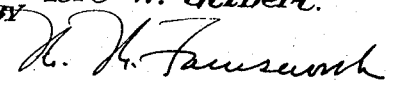
THEIR ATTORNEY

3,372,285
TRANSIENT VOLTAGE SUPPRESSORS
Frank V. Blazek, Monroeville, and Chalmers W. Gilbert, Penn Hills Township, Allegheny County, Pa., assignors to Westinghouse Air Brake Company, Swissvale, Pa., a corporation of Pennsylvania
Filed Oct. 9, 1964, Ser. No. 402,868
6 Claims. (Cl. 307—93)

ABSTRACT OF THE DISCLOSURE

The present invention relates to an improved transient voltage suppressor for protecting solid state apparatus by subduing high voltage surges or transients which might appear on a source of power. The transient voltage suppressors comprises a three terminal network consisting of a plurality of diodes, resistors, capacitors and inductors for providing protection from each side of the power source to ground as well as across each side of the power source. The diodes are serially connected from line to line with the intermediate junction connected to ground. Similarly, the resistors are serially connected from line to line with their intermediate junction also connected to ground. Likewise, a pair of capacitors are serially connected from line to line with their intermediate junction also being connected to ground. An additional capacitor is connected between line to line, and an inductor is connected in each line between the source and load terminals. Accordingly, the voltage suppressor is capable of handling surges or spikes of either alternating or direct current types which may occur from line to line or line to ground.

---

Our invention relates to a transient voltage suppressor and more particularly to a novel circuit arrangement for protecting solid state apparatus against high voltage transients and surges.

In the past, electronic equipment, such as solid state communication and control circuits, has been susceptible to numerous malfunctions, mainly component failures, due to the presence of high energy transients. This problem is quite pronounced in diesel electric locomotive equipment wherein transistorized power supplies are utilized for obtaining suitable power for operating railroad radio equipment.

While transistors have many advantages, such as great reliability, ruggedness of structure, and compactness, they are vulnerable to damage and/or destruction by transient voltages of excessive amplitude even though these voltages may occur at very short time durations, for example, only a few hundred microseconds. Accordingly, positive measures must be taken for subduing and preventing transient voltages of excess amplitude which appear in primary power sources from being applied to electronic apparatus which may be damaged or destroyed thereby.

While previous arrangements, such as filters and isolation circuits utilizing relays or transistors have been proposed, each of these former proposals lacks the necessary and essential requirements for insuring trouble free operation.

For example, filter circuits, which are designed around particular frequency characteristics, such as high pass, low pass, band pass, and so on, were not effective in eliminating high voltage transients occuring in a low frequency range, and further they, themselves, were susceptible to damage by extremely high inductive voltages with slow decay characteristics which occurs under certain circumstances. Additionally, as is readily apparent, as the frequency response of filtering circuits is lowered the cost and size of such filtering apparatus becomes prohibitive.

Further, the relay and transistorized isolation circuits have the inherent disadvantage of disconnecting the electronic apparatus to be protected from the main power source when operative which in many cases is intolerable. Further, since the proposed relay arrangements are inept to cope with voltage surges and spikes that are present in a diesel locomotive system but are merely selective interrupting means which disconnect the electronic apparatus from the power source, they have not been generally accepted in the railroad communication field. Similarly, the transistorized isolation circuits have proven unreliable since the protecting transistors themselves are susceptible to destruction and damage by certain types of sustained transient voltages.

In accordance with the present invention, our unique supressor circuit adequtely shunts transient voltages and surges irrespective of their type or source of origination from the electronic apparatus which is susceptible to damage therefrom and thereby provides maximum protection for the electronic apparatus. In reviewing the diesel locomotive battery and electrical system, which is unlike the conventional automobile system, it is noted that the former system is usually balanced with respect to ground. Therefore, in order to function satisfactorily, the voltage suppressor must be capable of handling at least six types of possible voltage surges that originate in the main battery or electrical systems of the diesel locomotive, that is, surges occurring from: positive (+) battery to ground, from ground to positive (+) battery, from negative (−) battery to ground, from ground to negative (−) battery, from positive (+) battery to negative (−) battery, and from negative (−) battery to positive (+) battery. Furthermore, in order to operate efficiently the transient voltage suppressor must operate to subdue both alternating current and direct current surges which are inherently present in diesel locomotive electrical systems. As is well known, these voltage surges and spikes may be caused in locomotive electrical systems by such effects as: opening the contactor of the auxiliary field on the main generators, opening of the main battery switch when an inductive load is connected across the circuit, the unintentional grounding or breakdown of insulation of an inductor between one side of the primary circuit and ground, or voltage surges produced in the main circuit during diesel locomotive start-up or maintenance.

Accordingly, it is a principal object of our invention to provide a new and improved transient voltage suppressor which effectively protects solid state apparatus from burnout by voltage surges or spikes.

Another object of our invention is to provide a protection circuit means which provides surge suppression on both alternating current and direct current surges.

A further object of our invention is to provide a transient protective circuit for suppressing voltage transients which may appear from either line-to-line or line-to-ground.

A still further object of our invention is to provide a transient voltage suppressor for solid state or like devices which is simple in design, economical to manufacture, efficient in operation, and endurable in use.

A still further object of our invention is to provide a unique protective network for solid state devices which overcomes the defects and disadvantages of prior art devices.

These and further objects and advantages of our invention will become apparent from the following specification when taken in connection with the accompanying drawings.

Briefly, our invention involves a transient voltage suppressor circuit for subduing high energy surges of both alternating current and direct current types. The circuit includes a first circuit path having asymmetrical conducting means for receiving and subduing surges of a first polarity, and a second circuit path including impedance means for receiving and subduing surges of a second polarity.

In practicing our invention, the transient voltage suppressor is connected between the electronic solid state device to be protected and the main power source of the locomotive electrical system wherein abnormal voltage surges and spikes to be suppressed are generated. As previously mentioned, these surges or spikes may be either alternating current or direct current in nature and may occur from line-to-line, or line-to-ground. Accordingly, the present suppressor must be capable of dealing with each type of transient which may occur in the primary power supply source. Therefore, the transient voltage suppressor of our invention involves a novel three-terminal network which consists of a plurality of diodes, inductors, resistors, and capacitors for providing protection from each side of the main power source to ground as well as across each side of the main power source. The diode means are serially connected from line-to-line with the intermediate junction connected to ground. Similarly, the resistor means are connected from line-to-line with their intermediate junction also being connected to ground. Likewise, capacitor means are coupled from line-to-line with their intermediate junction also being connected to ground. An additional capacitor means is connected between line-to-line, and an inductor means is connected in each line between the primary battery source and load terminals. Thus, the unique voltage suppressor network of our invention is capable of coping with all incident surges which may be present in a diesel locomotive primary power source.

The invention will be better understood after a consideration of the following detailed description and with reference to the accompanying drawings wherein:

FIG. 1 is a schematic diagram embodying one form of the invention;

FIG. 2 is a schematic diagram illustrating a modified form of the invention; and FIG. 3 is a schematic diagram illustrating another modified form of the invention.

Referring to the drawings, wherein like parts are indicated by like reference numerals in each figure, it is readily noted that the unique transient voltage suppressor of our invention is exemplified and generally illustrated by character 1 in FIG. 1. In the circuit illustrated, a direct current potential input is applied between battery terminals 10 and 11 from the main power source of a diesel locomotive electrical system, which may be, for example, a conventional 64-volt electrical system, and an output from the circuit is derived from load terminals 13 and 14 which in turn may be suitably adapted to be connected to the selected electronic or solid state apparatus. A pair of diodes 15 and 16, for example, selenium rectifiers, are connected between terminals 10 and 11 and are arranged such that the potential of the main power source normally reverse-biases these diodes. The resistors 17 and 18 which are of equal value are similarly connected across terminals 10 and 11. Terminal 10 is interconnected to terminal 13 by an inductance 19 while terminal 11 is interconnected to terminal 14 by an inductance 20. Polarized electrolytic capacitors 21 and 22, preferably of equal value, are serially disposed across terminals 13 and 14. Likewise, a similar polarized electrolytic capacitor 23 is coupled across terminals 13 and 14. The junction of diodes 15 and 16 is interconnected to the junction of resistors 17 and 18 and also is interconnected to the junction of capacitors 21 and 22 and all these junctions in turn are connected to ground.

During a normal condition of operation, that is, when no voltage spikes or surges are present on battery terminals 10 and 11, the power from the main battery source, except for a small loss in the resistance of inductors 19 and 20, is delivered from the input to the output of the transient voltage suppressor. As is readily apparent, under such an assumed normal condition of operation, by convention, the majority of current flows from terminal 10 of the main power source through inductance coil 19 to the load terminal 13 through the load apparatus to terminal 14 and back through inductance coil 20 to terminal 11 of the main power source. During this condition, the leakage current which passes through the combined resistance of resistors 17 and 18 is assumed to be negligible in that the value of this resistance is high in comparison to the value of the load resistance.

As previously mentioned, in order to operate efficiently as well as satisfactorily, the transient voltage suppressor must be capable of handling alternating current and direct current surges which appear from line-to-line or line-to-ground or vice versa. That is, transient conditions may occur wherein the voltage suppressor is exposed to any one of the following six conditions:

(1) A surge occurring from (+) battery to ground.
(2) A surge occurring from ground to (+) battery.
(3) A surge occurring from ground to (−) battery.
(4) A surge occurring from (−) battery to ground.
(5) A surge occurring from (+) battery to (−) battery.
(6) A surge occurring from (−) battery to (+) battery.

As is readily apparent, whenever transient conditions (2), (4) and (6) prevail at the suppressor input, the transients are shunted through the forward direction of the diodes 15 and 16. That is, under condition (2) surge current flows from ground through the forward direction of diode 15 to the (+) positive battery terminal 10 and thereafter back to the source. Similarly, under condition (4) surge current flows from (−) negative battery terminal 11 through the forward direction of diode 16 to ground and back to the source. Under condition (6) surge current flows from (−) negative battery terminal 11 through the forward direction of diodes 16 and 15 to the (+) positive battery terminal 10. As is readily evident in each of the above cases, the surges are diverted away from the load terminals 13 and 14 and returned to the main power supply so that the supply, itself, is forced to dissipate the energy of the transients in its resistive components rather than compelling the transient energy to be dissipated in the electronic load apparatus wherein it may cause damage or destruction to the solid state components. Accordingly, the load voltage appearing across terminals 13 and 14 is kept comparatively low and only varies slightly in proportion to the amount of voltage drop across diodes 15 and 16.

Now assuming that types of surges appearing in conditions (1), (3) and (5) prevail at the input of the transient voltage suppressor, under these conditions diodes 15 and 16 are in a blocked condition and the capacitors 21, 22 and 23 must accept the surges. That is, under condition (1), surge energy appearing at (+) positive battery terminal 10 is first choked back by inductance coil 19 so that some of the energy is dissipated in the resistive network of the main battery supply source with the remainder of the energy being accepted by capacitor 21 which causes charging of capacitor 21. Similarly, under condition (3), the energy appearing at ground is choked back by the inductance of coil 20 so that some of the energy is caused to be dissipated in the resistive network of the main battery supply with the remainder portion of the energy being accepted by capacitor 22. Likewise, under condition (5), inductors 19 and 20 in combination with capacitors 21, 22 and 23 operate to cause a surge energy to be dissipated in the resistive network of the main power supply. Since the amount of voltage appearing at outputs terminals 13 and 14 is dependent upon the duration of the surge, the size of the capacitors is chosen such that the output voltage present across terminals 13 and 14 is kept at a low level. For this reason, the electronic apparatus connected across load terminals 13 and 14 is virtually unaffected and protected from high energy transient surges which may be present in the primary battery system.

Further, the value of resistors 17 and 18, which provide a discharge path for capacitors 21, 22 and 23, is so proportioned that the capacitors may accept successive or repetitive surges of any given type. Additionally, the use of diodes 15 and 16 provides an automatic polarization of the alternating current surges so that the LC network need only handle surges under condition (1), (3) and (5). This automatic polarization of the surges permits the use of polarized electrolytic capacitors wherein high capacitance values are available at substantially lower cost and smaller size. Therefore, a more compact and less costly transient voltage suppressor is realized.

The embodiment shown in FIG. 2 differs from that of FIG. 1 in that the rectifiers 15 and 16, and resistors 17 and 18 are connected to the load side of the transient voltage suppressor 1. While the operation of FIG. 2 is substantially identical to that of FIG. 1, as explained above, this circuit has the added advantage that the inductors 19 and 20 choke off steep wave-fronts of fast rising surges so that diodes 15 and 16 ae given additional protection against damage occurring therefrom. This circuit is advantageously used in diesel locomotive electrical systems which are susceptible to a majority of surges or spikes which occur under the above-mentioned conditions (1), (3) and (5). That is, where transient conditions (1), (3) and (5) are prevalent in a system, it is advantageous to utilize the embodiment shown in FIG. 2 because an added protective feature to the diodes is realized.

The embodiment of FIG. 3 differs from that of FIG. 2 and FIG. 1 in that the capacitors 21 and 22 are connected to the input or battery side of the transient voltage suppressor 1. Like in FIG. 2, the diodes 15 and 16 of FIG. 3 are afforded added protection from steep wave-fronts of fast rising surges; however, in this case by means of capacitors 21 and 22. Like in FIG. 2, FIG. 3 is advantageously used in electrical systems in which conditions (1), (3) and (5) are prevalent. However, FIG. 3 has the added advantage over FIG. 2 in that the wire size of the choke coils 19 and 20 may be greatly reduced since the high energy surges which occur during starting conditions of the diesel locomotive, that is, surges occurring during conditions (2) and (4), as noted above, need not be accommodated by choke coils 19 and 20. Accordingly, FIG. 3 has the diode protective feature and yet employs smaller inductor coils.

Further, it may be noted that the preferred embodiments utilize selenium type rectifiers as the asymmetrical conducting devices; however, it is quite possible to employ other types of diodes, for example, Zener or avalanche type diodes, in their place where such conditions prevail to warrant their use. As is readily apparent, the use of Zener type diodes insures an added protective of regulating the value of surge voltages appearing on the output terminals during conditions (1), (3) and (5) since such an application would limit the output voltage surges to the reverse breakdown voltage of the Zener or avalanche diodes.

While the present invention has been generally described in relation to diesel electrical locomotive systems, it is readily evident to those skilled in the art that the transient voltage suppressor, as shown and described, is applicable to any other system wherein similar surge and spike conditions exist.

Although we have herein shown and described only the preferred forms or embodiments of our invention, it is readily understood that various changes and modifications may be made therein within the scope of the appended claims without departing from the spirit and scope of our invention.

Having thus described our invention, what we claim is:

1. A polarity responsive circuit for protecting a solid state load against damage by high energy voltage surges comprising, a pair of input terminals and output terminals, a first circuit means including first and second diode means serially connected between said pair of input terminals, a second circuit means including a first inductor connected between one of said pair of input terminals and one of said pair of output terminals, a second inductor connected between said other of said pair of input terminals and said other of said output terminals, first and second capacitors serially connected between said pair of output terminals, a third capacitor connected between said pair of output terminals, and a ground connection coupled to the junction of said serially connected diodes and capacitors, whereby a surge of a first polarity present on said input terminals causes operation of the first circuit means and a surge of a second polarity present on said input terminal causes operation of the second circuit means so that either polarity type of surge is shunted and thereby prevented from appearing at said output terminals.

2. A polarity suppressor circuit for eliminating both alternating current and direct current types of high energy surges on a load comprising, a pair of input and output terminals, a pair of asymmetrical conducting devices serially coupled to said pair of input terminals, a pair of resistors serially coupled to said pair of input terminals, a pair of choke coils with one choke coil connected between one of said pair of input terminals and one of said pair of output terminals and the other choke coil connected between said other of said pair of input terminals and said other of said output terminals, a pair of polarized electrolytic capacitors serially coupled to said pair of output terminals, an additional polarized electrolytic capacitor coupled to said pair of output terminals, and a common ground connection interconnecting the junction of said serially coupled diodes, resistors, and capacitors, whereby one polarity type of surge present on said input terminals is subdued by said asymmetrical means and whereby the other polarity type of surge present on said input terminals is subdued by said coils and capacitors thereby preventing either type of surge from being applied to said output terminals.

3. A polarity responsive circuit for protecting a solid state load against damage by high energy voltage surges comprising, a pair of input and output terminals, a first circuit means including first and second diode means serially connected between said pair of output terminals, a second circuit means including a first inductor connected between one of said pair of input terminals and one of said pair of output terminals, a second inductor connected between said other of said pair of input terminals and said other of said output terminals, first and second capacitors serially connected between said pair of output terminals, a third capacitor connected between said pair of output terminals, and a ground connection coupled to the junction of said serially connected diodes and capacitors, whereby a surge of a first polarity present on said input terminals causes operation of the first circuit means and a surge of a second polarity present on said input terminal causes operation of the second circuit means so that either polarity type of surge is shunted and thereby prevented from appearing at said output terminals.

4. A polarity suppressor circuit for eliminating both alternating current and direct current types of high energy on a load comprising, a pair of input and output terminals, a pair of asymmetrical conducting devices serially coupled to said pair of output terminals, a pair of resistors serially coupled to said pair of output terminals, a pair of choke coils with one choke coil connected between one of said pair of input terminals and one of said pair of output terminals and the other choke coil connected between said other of said pair of input terminals and said other of said output terminals, a pair of polarized electrolytic capacitors serially coupled to said pair of output terminals, an additional polarized electrolytic capacitor coupled to said pair of output terminals, and a common ground connection interconnecting the junction of said serially coupled diodes, resistors and capacitors whereby one polarity type of surge present on said input terminals is subdued by said asymmetrical means and whereby the other polarity type of surge present on said input terminals is subdued by said inductors and capacitors thereby preventing either type of surges from presenting high energy at said output terminals.

5. A polarity responsive circuit for protecting a solid state load against damage by high energy voltage surges comprising, a pair of input and output terminals, a first circuit means including first and second diode means serially connected between said pair of input terminals, a second circuit means including a first inductor connected beween one of said pair of input terminals and one of said pair of output terminals, a second inductor connected between said other of said pair of input terminals and said other of said output terminals, first and second capacitors serially connected between said pair of input terminals, a third capacitor connected between said pair of output terminals, and a ground connection coupled to the junction of said serially connected diodes and capacitors, whereby surges of a first polarity present on said input terminals cause operation of the first circuit means and surges of a second polarity present on said input terminal cause operation of the second circuit means so that either polarity type is shunted and thereby prevented from appearing at said output terminals.

6. A polarity suppressor circuit for eliminating both alternating current and direct current types of high energy surges on a load comprising, a pair of input and output terminals, a pair of asymmetrical conducting devices serially coupled to said pair of input terminals, a pair of resistors serially coupled to said pair of input terminals, a pair of choke coils with one choke coil connected between one of said pair of input terminals and one of said pair of output terminals and the other choke coil connected between said other of said pair of input terminals and said other of said output terminals, a pair of polarized electrolytic capacitors serially coupled to said pair of input terminals, an additional polarized electrolytic capacitor coupled to said pair of output terminals, and a common ground connection interconnecting the junction of said serially coupled diodes, resistors and capacitors whereby one polarity type of surge present on said input terminals is subdued by said asymmetrical means and whereby the other polarity type surge present on said input terminals is subdued by said coils and capacitors thereby preventing either type of surges from presenting high energy at said output terminals.

References Cited
UNITED STATES PATENTS

| | | | |
|---|---|---|---|
| 1,577,248 | 3/1926 | Cohen | 307—105 |
| 1,829,254 | 10/1931 | Asch | 321—10 X |
| 1,835,121 | 12/1931 | Rentschler | 321—10 X |
| 1,929,057 | 10/1933 | Dellenbaugh | 321—10 |
| 3,117,292 | 1/1964 | Bixby | 321—10 X |

ORIS L. RADER, *Primary Examiner.*

T. J. MADDEN, W. E. DUNCANSON,
*Assistant Examiners.*